Patented June 1, 1954

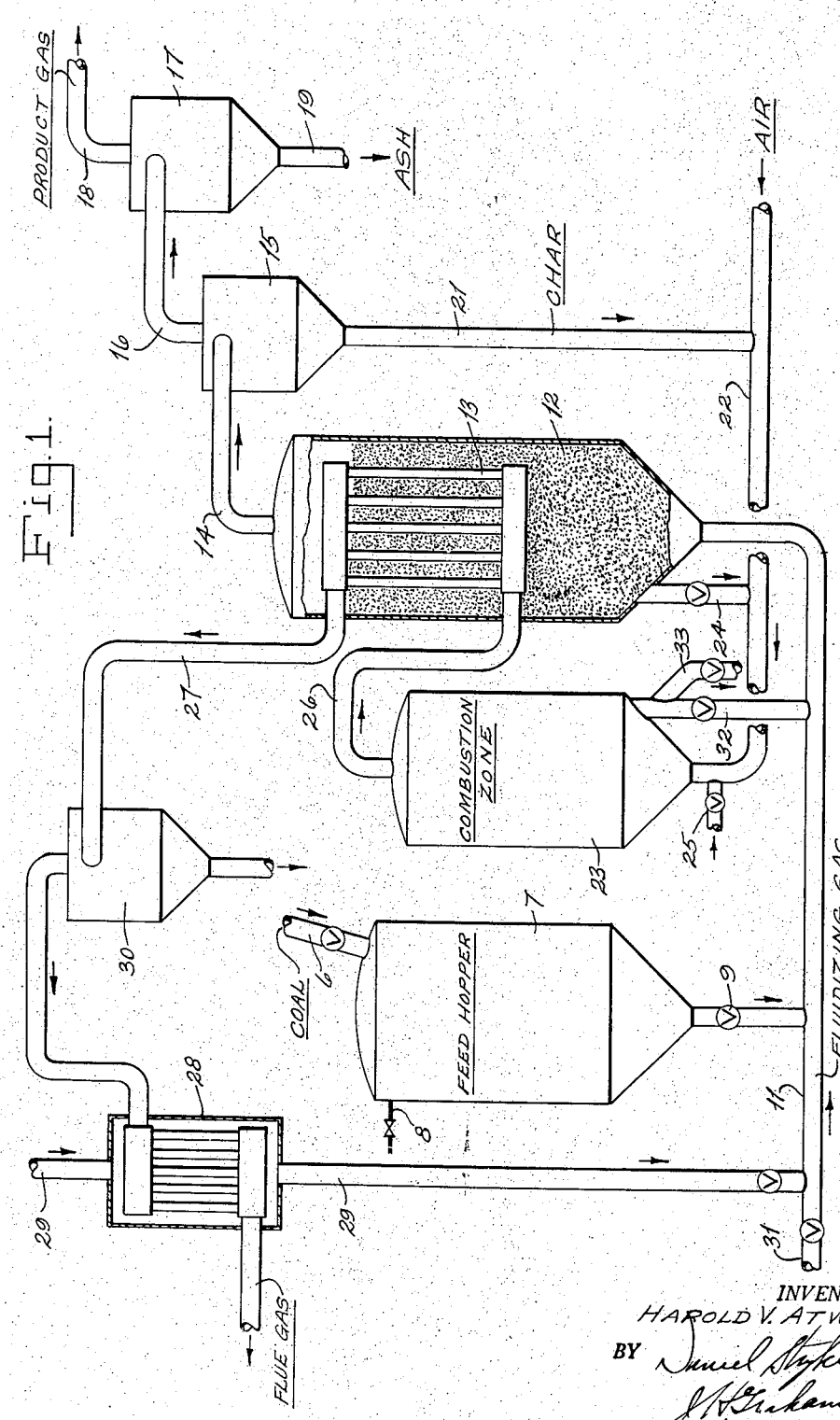

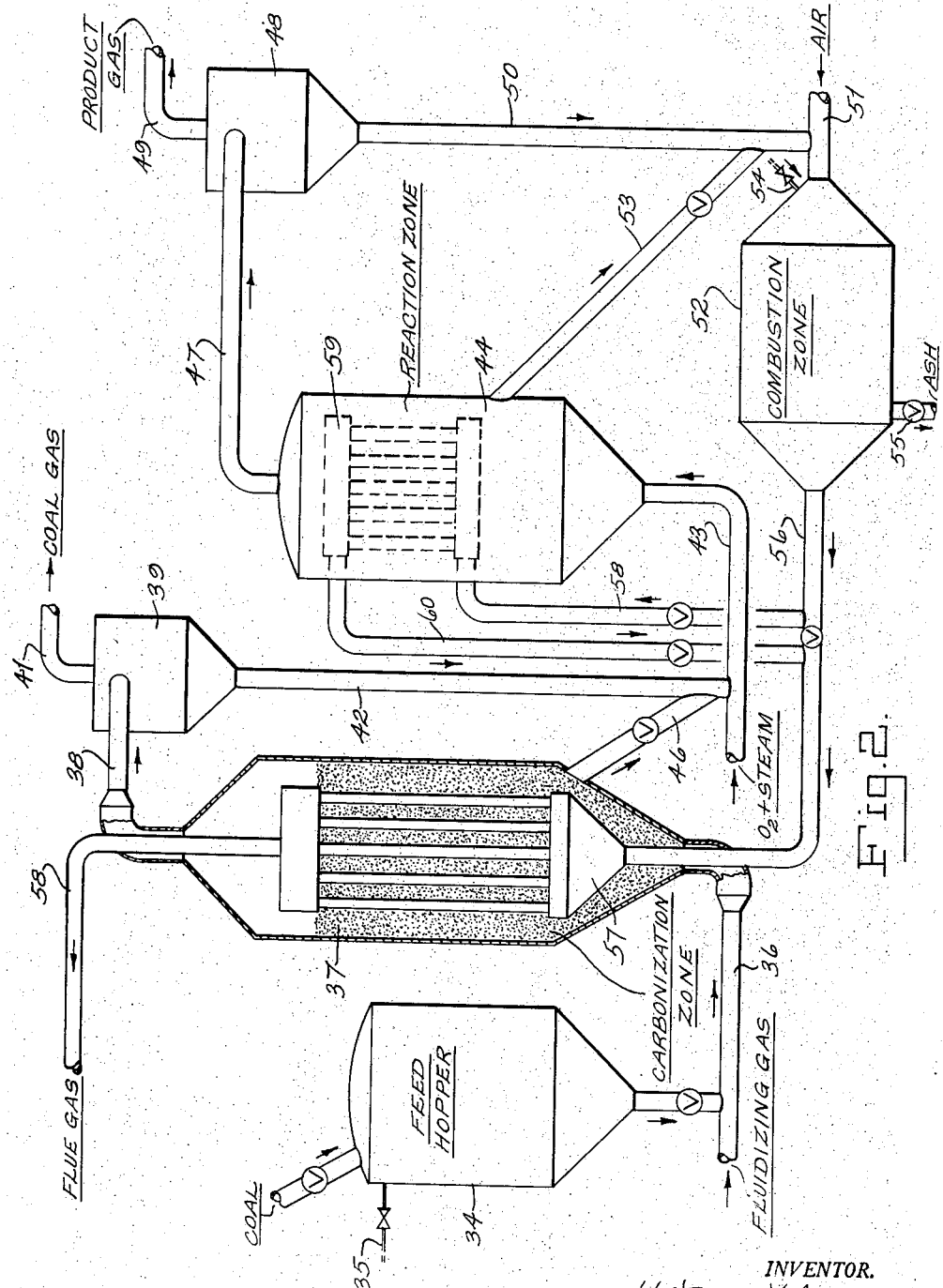

2,680,065

UNITED STATES PATENT OFFICE 2,680,065

GASIFICATION OF CARBONACEOUS SOLIDS

Harold V. Atwell, Beacon, N. Y., assignor to The Texas Company, New York, N. Y., a corporation of Delaware Application May 26, 1948, Serial No. 29,340

5 Claims. (Cl. 48—202)

This invention relates to a process for the gasification of a solid carbonaceous material. In one of its more specific aspects it relates to a process for the gasification of coal, oil shale, lignite and the like wherein at least a portion of the heat required for gasification is supplied by burning a portion of the carbonaceous residue.

Fluidization of solids in finely-divided form by passing a gas upwardly through a bed of said solids is a well known procedure. Coal, for example, in finely-divided form, may be treated in a fluidized bed with hot inert gas to effect distillation of volatile constituents therefrom. Carbonaceous solids may also be gasified in a fluidized bed by reaction with an oxidizing gas. It has been found that some difficulty is experienced in effecting reaction between a gaseous reactant and very small particles of carbonaceous material. These small particles tend to become entrained in the gas stream where they are surrounded by an envelope of gas so that the reaction between the particles and the reacting gas is hindered or substantially prevented. Consequently, in a system wherein a reaction is carried out between gases and fluidized carbonaceous solids, a portion of the carbon is lost by entrainment of small particles in the effluent gases.

For dry distillation or carbonization, an unreactive fluidizing gas is used as the fluidizing medium. For carbonization of coal, for example, the fluidizing gas may comprise nitrogen; methane or other light hydrocarbon gases; a fixed gas fraction or an unseparated portion of the gases evolved from carbonization; and the like. For gasification under reaction conditions, the fluidizing gas stream contains gaseous reactants, such as oxygen and steam. The heat required for gasification may be supplied by indirect heat exchange; by an exothermic reaction, for example, reaction with oxygen; by direct heat exchange between hot gases or solids, e. g., inert solid particles, and the carbonaceous material; or by combinations of the foregoing.

In accordance with this invention, solid carbonaceous material is subjected to gasification in a fluidized bed and those carbon-containing particles entrained in the effluent gas are separated from the gas stream and separately burned. The entrained particles containing residual carbon, which is difficult to gasify, are burned with air in a separate zone to carbon-free ash. The relatively large amount of heat released in burning the residual carbon is used to supply at least a portion of the heat of gasification.

The process of the present invention is useful for carbonization, or partial gasification, of carbonaceous materials containing volatile constituents, e. g., coal, as well as for complete gasification. In carbonization, the volatile constituents are driven off by heat to produce a char or coke residue. Gasification by chemical reaction may be carried to substantial completion leaving only ash or, alternatively, a low carbon content char as the residual solid.

The present process is applicable to various gasification procedures including the simultaneous distillation of volatile constituents from the solid material and reaction with a gasifying reactant, for example oxygen, steam, carbon dioxide, and the like.

An object of this invention is to provide an improved process for the gasification of solid carbonaceous material.

Another object is to provide an improved process for the carbonization and gasification by chemical reaction of a solid carbonaceous material containing volatile constituents.

Still another object is to provide an improved process for the gasification of solid carbonaceous materials by chemical reaction with a gaseous reactant in a fluidized bed.

Other objects and advantages of this invention will be apparent from the following detailed description and accompanying illustrative drawings.

Fig. 1 of the drawings is a diagrammatic elevational view, partly in cross-section, of apparatus suitable for carrying out the present process and illustrating one embodiment of my invention.

Fig. 2 is a diagrammatic elevational view similar to Fig. 1 illustrating another embodiment of my invention.

The present invention will be described in detail with reference to coal as the carbonaceous material as typifying the operation and applications of the process of this invention. It will be understood that coal is used as a specific example and that the apparatus and method described are not limited to the use of coal as the carbonaceous feed material. Since the gasification of various materials is known in the art, the application of the present invention to other solid carbonaceous materials will be evident to one skilled in the art from the detailed description of this invention and illustrative examples of its application to treatment of coal.

In accordance with this invention, the coal, for example, is reduced to small particles of a size suitable for fluidization. The average particle size should be generally less than about 10 mesh and preferably about 85 per cent less than 100 mesh. The pulverized coal is fed into a fluidized bed wherein gasification takes place. Carbonization may be carried out simultaneously with the gasification by chemical reaction in a single reaction zone or concurrently in separate zones. A substantial portion of the heat for the gasification is supplied by indirect heat exchange with hot gases. Coal distillates and various other product gases may be obtained, such, for example, as charge gas for the synthesis of hydrocarbons, fuel gas or the like. Finely-divided residual solid resulting from the gasification by chemical reaction and containing residual carbon is passed to a separate combustion zone. This residual solid is substantially completely burned with air to ash under conditions effecting maximum heat release, that is, burning of the carbon to carbon dioxide. The resulting flue gas is passed through a heat exchanger in indirect heat exchange with a fluidized bed of carbonaceous particles in a gasification zone to supply heat for gasification.

With reference to Fig. 1 of the drawing, the carbonaceous feed material, for example, coal, is fed through line 6 into a feed hopper 7. A non-oxidizing gas may be supplied to the hopper through line 8 to build up pressure therein equal to the reaction pressure. The gas forms an inert blanket in the hopper avoiding explosion hazards. The powdered coal is fed from the hopper through a valve 9, suitably a rotary valve conventional for handling solids, into a stream of fluidizing gas in line 11. The powdered coal dispersed in the gas stream passes through line 11 into a gasification zone 12 wherein a fluidized bed of carbonaceous materials in various stages of gasification is maintained. The gas stream in line 11 consists essentially of oxygen and steam, but may contain hydrocarbons, carbon dioxide, diluents, etc.

Heat is supplied to the reaction zone 12 by indirect heat exchange with hot gases in a heat exchanger 13. The heat exchanger may supply all or a portion of the heat required for gasification. The heat exchanger is preferably placed somewhat above the point of introduction of oxygen to supply heat for endothermic reactions which follow the exothermic reaction with oxygen.

Effluent gases from the reaction zone are discharged through line 14 into a separator 15 wherein char or entrained residual particles containing carbon are separated from the stream of product gas. Ash entrained in the product gas may also be separated therefrom in separator 15. The product gas may be passed through line 16 to a second separator 17 wherein any remaining entrained solids, mostly ash, are separated from the gas. Separators 15 and 17 may suitably be of the cyclone type. The product gas, substantially free from entrained solid particles, is withdrawn from the system through line 18 for use as desired. Ash is discharged from the system through line 19.

The char or residual solid particles containing carbon which are carried over from zone 12 through line 14 with the product gas and recovered in separator 15 are passed through line 21 into admixture with air in line 22. The air in admixture with char and ash from separator 15 passes through line 22 into a combustion zone 23. Additional char may be supplied to the combustion zone through line 24 as desired. Additional fuel, air, or both, may be supplied as required through line 25.

In the combustion zone, the residual carbon in the solid particles is burned substantially completely with air to give a flue gas comprising essentially nitrogen and carbon dioxide, and substantially carbon-free ash. The flue gas is passed through line 26 to the heat exchanger 13 wherein it supplies heat for the gasification reaction by indirect heat exchange with the fluidized particles of carbonaceous material undergoing gasification. The cooled flue gas is discharged from the heat exchanger through line 27 from which it may be passed to a heat exchanger 28 in indirect heat exchange with a stream of gas in line 29. A separator 30 may be provided to effect removal of ash or other entrained solids from the gas stream. Preferably, the gas stream in line 29 forms part or all of the stream of fluidizing gas. Additional fluidizing gas may be admitted to the system through line 31.

Hot ash from the combustion zone 23 may be passed through line 32 into the gas stream in line 11 wherein it is admixed with the coal and gas prior to introduction to the reaction zone. The hot ash from the combustion zone serves to supplement the heat supplied to heat exchanger 13 and thereby supplies a part of the heat required for gasification. The ash eventually is discharged from the system through line 19. Alternatively, the ash may be discharged directly from the combustion zone through line 33 and utilized, if desired, to supply heat for preheating one of the incoming gas streams.

In the embodiment of the invention illustrated in Fig. 2, the coal is carbonized or distilled to drive off volatile constituents prior to gasification by reaction with oxygen and steam. Coal from the feed hopper 34, pressurized by line 35, is admixed with fluidizing gas in line 36 and passed into a fluid bed in carbonization zone 37. In zone 37 volatile constituents from the coal are driven off by heat, at least a portion of which is supplied by indirect heat exchange with hot gases as will be described in more detail hereinafter.

The coal gas or volatiles are discharged from zone 37 through line 38 to a separator 39. In the separator 39, entrained carbonaceous particles are separated from the coal gas stream. The coal gas, substantially free from entrained solids, is discharged through line 41. Coal gas may be recycled to the carbonization zone as the fluidizing gas. Tar, oil, etc., may be separated from the coal gas and the fixed gases used as the fluidizing gas. The fixed gases may be used for generation of synthesis gas, as additional fuel for the combustion zone, for general fuel purposes, etc.

Carbonaceous particles separated from the coal gas in separator 39 pass through line 42 into line 43 where they are admixed with a gas stream comprising oxygen and steam and carried into reaction zone 44. Additional carbonaceous particles may be supplied to the reaction zone from the carbonization zone through line 46.

In the reaction zone 44, gasification of solid carbonaceous particles is accomplished by chemical reaction between the carbon content of said particles and the oxygen and steam. Preferably, reaction zone 44 is operated as a fluid bed reactor.

The product gas containing entrained ash and small carbonaceous particles is discharged through line 47 to a separator 48 wherein substantially all of the entrained solid is separated therefrom. Product gas is discharged from the system through line 49.

Carbonaceous particles and ash separated from the product gas stream in separator 48 pass through line 50 into admixture with air in line 51. The residual carbon in the solid material from line 51 is burned with air in combustion zone 52 to substantial completion producing flue gas and ash. Additional carbonaceous material may be supplied to the burner from the reaction zone 44 through line 53 as desired. Additional gaseous, liquid or solid fuel, air or the like may be supplied as required through line 54. Ash may be discharged through vent 55 or entrained in the flue gas.

The flue gas passes through line 56 from which it may be passed directly to heat exchanger 57 situated within the carbonization zone 37. Alternatively, the hot combustion gases may be passed, all or in part, through line 58 to a heat exchanger 59 in reaction zone 44. Thus the hot gases may be used to supply at least a part of the heat required for gasification. The heat exchanger 59 is preferably placed at a point in the gasification zone somewhat above the point of introduction of oxygen to supply heat to that section of the bed where predominantly endothermic reactions take place. The gases leaving the heat exchanger 59 are then passed through line 60 to the heat exchanger 57 in the carbonization zone. This arrangement, passing the hot gases from the combustion zone through the reaction zone and carbonization zone in series, is often particularly advantageous in effecting a saving in concentrated oxygen required for generation of synthesis gas or the like. This flue gas supplies at least a portion of the heat required for carbonization. The heat exchanger 57 gives efficient indirect heat transfer between the flue gas and the fluidized particles of carbonaceous material undergoing carbonization in zone 37. The flue gas is discharged from the heat exchanger through line 58.

Heat exchange between various streams in the system of Fig. 2 may be employed to increase the efficiency of utilization of heat. For example, the flue gas, after leaving the gasification zone, may be passed in heat exchange with a fluidizing gas stream as in Fig. 1. Hot ash may be admixed with fresh feed to supply part of the heat of gasification or utilized to preheat gas streams, etc.

The fluidizing gas supplied through line 36 may be an inert gas such as a light hydrocarbon gas, a selected gaseous fraction of the stream discharged through line 41, or a similar gas stream.

When lignite is used as the solid carbonaceous feed material, preferably a portion of the gas stream from the carbonization zone is utilized without intermediate treatment as the fluidizing gas for said zone. Thus, in zone 37, with lignite, equilibrium is attained by indirect heating of the lignite in the absence of added steam and the resulting char is then reacted in reaction zone 44 with extraneous steam and free oxygen to accomplish gasification of the char. Gas produced in this manner in the carbonization zone contains a considerable quantity of carbon monoxide and hydrogen due to the reaction between carbonaceous matter and moisture contained in the lignite. After separation of tars, the gaseous products from this treatment of lignite may be combined with the gaseous product obtained by chemical reaction. The product gases are useful as fuel gas, charge gas for hydrocarbon synthesis, and the like.

Ash may be entrained in the flue gas from the combustion zone 52 and fluidized in heat exchangers 57 and 59 to improve the heat transfer between the flue gases and the carbonaceous particles in the respective gasification zone. Preferably, the ash is separated from the flue gas and a separate inert material in the form of solid particles of a size suitable for fluidization provided within the heat exchangers as a fluidized bed aid in the heat transfer. Similarly, an inert solid heat transfer material may be provided in the heat exchanger 13 of Fig. 1 and the exchanger so operated that the solid material is in a fluidized fixed bed within the exchanger thus aiding in heat transfer between the flue gases and the carbonaceous particles in reactor 12.

As an example of the operation of my invention, coal is crushed to a particle size such that 85 per cent passes a 100 mesh screen with not over 15 per cent smaller than 200 mesh. This coal is charged with steam to a fluidized fixed bed gasifier operated at 1800° F. and 50 pounds per square inch gauge. Oxygen is added for production of carbon monoxide and to supply heat for reaction of carbonaceous matter and steam. The gas withdrawn from the gasification zone comprises hydrogen and carbon monoxide in a ratio of about 2 to 1. Sufficient char is burned with air in a separate zone to supply additional heat to the gasification zone by indirect heat exchange to maintain the desired proportions of carbon monoxide and hydrogen in the product gas. The flue gas, after supplying heat to the gasification zone, is used to preheat the steam and oxygen streams and for steam generation.

Obviously many modifications and variations of the invention as hereinabove set forth may be made without departing from the spirit and scope thereof and therefore only such limitations should be imposed as are indicated in the appended claims.

I claim:

1. In a process for the gasification of a finely divided solid carbonaceous material in a dense phase fluidized bed by reaction with steam in a gasification zone, the improvement which comprises maintaining gas velocities within said gasification zone sufficient to entrain partly gasified carbonaceous particles, discharging from the upper portion of said gasification zone a stream of product gas containing said entrained partly gasified carbonaceous particles, separating said carbonaceous particles from the discharged gas, substantially completely burning residual carbon from said carbonaceous particles with air in a combustion zone, and passing said resulting hot combustion gas in indirect heat exchange with the carbonaceous particles undergoing gasification in said fluidized bed.

2. A process as defined in claim 1 wherein the hot combustion gases are passed through a dense phase fluidized bed of solid inert heat transfer material in indirect heat exchange with said fluidized bed of carbonaceous material.

3. In a process for the gasification of a finely divided solid carbonaceous material in a dense phase fluidized bed by reaction with substantially pure oxygen and steam in a reaction zone, the improvement which comprises maintaining the velocity of the fluidizing gases comprising said oxygen and steam and the resulting product gases in said zone sufficient to entrain partly gasified carbonaceous particles, separating said particles from the effluent gas from said zone, substantially completely burning residual carbon from said carbonaceous particles with air in a combustion zone, and passing the resulting hot combustion gases in indirect heat exchange with carbonaceous particles undergoing gasification in said reaction zone whereby the oxygen requirements for said zone are substantially reduced.

4. A process for the gasification of a solid carbonaceous material containing volatile constituents which comprises charging said material to a heated dense phase fluidized bed carbonization zone wherein volatile constituents are separated therefrom by distillation leaving a carbonaceous char, passing char from said carbonization zone directly to a reaction zone wherein gasification of a portion of the carbon in said char is accomplished by reaction in a fluidized bed with steam, maintaining gas velocities within said reaction zone sufficient to entrain partly gasified carbonaceous particles, withdrawing said entrained residual solid material containing carbon from said reaction zone, substantially completely burning carbon from said residual material with air in a combustion zone, passing the resulting hot combustion gases in indirect heat exchange with char in said reaction zone to supply heat thereto, and thereafter passing the combustion gases in indirect heat exchange with carbonaceous material in said carbonization zone to supply heat for vaporizing volatile constituents from said material.

5. A process as defined in claim 4 wherein oxygen is supplied to said reaction zone together with steam.

References Cited in the file of this patent

UNITED STATES PATENTS

| Number | Name | Date |
|---|---|---|
| Re. 15,826 | Odell | Apr. 29, 1924 |
| 1,747,676 | Kerr | Feb. 18, 1930 |
| 1,758,630 | Trent | May 13, 1930 |
| 1,954,351 | Dornbrook et al. | Apr. 10, 1934 |
| 2,276,343 | Reyerson | Mar. 17, 1942 |
| 2,436,938 | Scharmann et al. | Mar. 2, 1948 |
| 2,482,187 | Johnson | Sept. 20, 1949 |
| 2,493,498 | Peery | Jan. 3, 1950 |
| 2,554,263 | Nelson | May 22, 1951 |
| 2,619,415 | Hemminger | Nov. 25, 1952 |

FOREIGN PATENTS

| Number | Country | Date |
|---|---|---|
| 236,780 | Great Britain | July 16, 1925 |
| 310,686 | Great Britain | May 2, 1929 |
| 582,055 | Great Britain | Nov. 4, 1946 |